United States Patent [19]
Stiegler et al.

[11] Patent Number: 5,826,037
[45] Date of Patent: Oct. 20, 1998

[54] METHOD FOR DETERMINING THE POSITION OF A NETWORK SUBSCRIBER IN A NETWORK

[75] Inventors: Andreas Stiegler, Karlsbad; Patrick Heck, Durmersheim; Herbert Hetzel, Weingarten, all of Germany

[73] Assignee: Becker GmbH, Karlsbad, Germany

[21] Appl. No.: 595,833

[22] Filed: Feb. 2, 1996

[30] Foreign Application Priority Data

Feb. 2, 1995 [DE] Germany ............... 195 03 206.3

[51] Int. Cl.⁶ .................................................. G06F 13/00
[52] U.S. Cl. .................. 395/200.81; 395/200.38; 395/200.52; 370/222
[58] Field of Search ................ 395/200.52, 200.81, 395/200.3; 370/403, 453, 455, 222, 248

[56] References Cited

U.S. PATENT DOCUMENTS

| | | | |
|---|---|---|---|
| 4,385,351 | 5/1983 | Matasuura et al. | 395/200.81 |
| 4,881,074 | 11/1989 | Reichbauer et al. | 370/248 |
| 5,461,608 | 10/1995 | Yoshiyama | 370/455 |
| 5,485,578 | 1/1996 | Sweazy | 395/200.81 |
| 5,504,747 | 4/1996 | Sweazy | 370/403 |
| 5,590,117 | 12/1996 | Iida et al. | 370/248 |
| 5,715,475 | 2/1998 | Munson et al. | 395/200.38 |
| 5,729,686 | 3/1998 | Heck et al. | 395/200.52 |

*Primary Examiner*—Parshotam S. Lall
*Assistant Examiner*—Patrice L. Winder
*Attorney, Agent, or Firm*—Herbert L. Lerner; Laurence A. Greenberg

[57] ABSTRACT

A method for determining the position of a network subscriber is used in a network having a ring structure with a plurality of network subscribers being connected to one another, including one network subscriber being used as a master. At the onset of network operation, the master generates a number that represents a subscriber's positional designation and stores it internally in memory. Beginning with the master, each network subscriber causes the network subscriber immediately following it in the ring structure to store a number in memory that likewise each represents its positional designation and that is raised by a number over its predecessor's own positional designation. This continues until an individual positional designation has been assigned to each network subscriber. The method may be used for individual and targeted communication with physically identical network subscribers, such as speaker boxes, as well as in stationary or mobile communications systems.

9 Claims, 2 Drawing Sheets

METHOD FOR DETERMINING THE POSITION OF A NETWORK SUBSCRIBER IN A NETWORK

BACKGROUND OF THE INVENTION

FIELD OF THE INVENTION

The invention relates to a method for determining the position of a network subscriber in a network having a ring structure with a plurality of network subscribers being connected to one another, including one network subscriber being used as a master.

The present invention shows a network with ring-like architecture, in which the subscribers forming data sources and data sinks are connected through a single data line. The source and control data are transferred through that data line in a continuous data stream which is synchronous to a clock signal. The clock signal is generated by a single subscriber, referred to below as a master. All other subscribers, referred to below as a slave, synchronize themselves to that clock signal. Purely asynchronous data transmission methods have to be differentiated therefrom as packet or package-oriented data transmission methods, for example ATM-methods.

In a ring-like network of the type referred to above, a plurality of physically identical network subscribers are often connected with one another. Since those network subscribers then necessarily each have identical identifications, those physically identical network subscribers can never be provided with information, except in common. It is not possible to communicate with individual network subscribers with individual, selective data in a deliberate way.

In order to circumvent that problem, it is usual, before the network is put into operation, to assign the individual, physically identical network subscribers different characteristics, in particular addresses, through the use of a manual intervention, for example by adjusting jumpers. However, that is complicated and uneconomical.

SUMMARY OF THE INVENTION

It is accordingly an object of the invention to provide a method for determining the position of a network subscriber in a network, which overcomes the hereinafore-mentioned disadvantages of the heretofore-known methods of this general type and which permits selective communication even with physically identical network subscribers with the least possible effort.

With the foregoing and other objects in view there is provided, in accordance with the invention, a method for determining the position of a network subscriber in a network having a ring structure with a plurality of network subscribers being connected to one another and including one network subscriber being used as a master. The improvement comprises: generating a number representing a positional designation of a subscriber in the master at an onset of network operation and storing the number internally in memory in the master; and assigning an individual positional designation to each network subscriber by having each network subscriber, beginning with the master, cause the network subscriber immediately following it in the ring structure to store a number in memory each representing one subscriber's positional designation and being raised by a number over the subscriber's positional designation of the network subscriber preceding it, such that the master is enabled, based on information concerning the ring structure of the network, to supply each of the subscribers with selected data depending on the individual positional designation thereof In other words, the master knows the physical image of the ring-shaped network, i.e., it knows the physical position and the characteristics of each subscriber within the ring. Based on the determined and repsectively associated positional designation, it is possible to assure communication which is individualized and adapted to the characteristics of the subscriber. That means that the speaker for the left channel receives a different positional designation as compared to the speaker for the right channel and it is therefore possible to supply the left speaker selectively with different data as compared with the right speaker, in spite of their physically different characteristics, on the basis of the information regarding the structural characteristics of the network and of the subscribers.

According to the invention, the network subscriber being used as the master accordingly stores a certain number, which thereafter represents the physical position of the master, in memory at the beginning of network operation. Next, the master raises this number, for instance by one, and transmits this raised number to the network subscriber directly following the master in the ring structure. That network subscriber receives this number, raised by one, and stores it internally in memory. This stored number then represents the physical position of this network subscriber that follows the master.

The network subscriber following the master then raises the stored or memorized number in turn, for example by one, and transmits that number to the network subscriber that follows it, whereupon the process described above is repeated.

Once a number or a positional designation has been stored in memory in this way in each network subscriber that is present in the network, an individual positional designation is then present in memory in all of the network subscribers, including the physically identical ones. In the example described, the positional designations of successive network subscribers always differ by precisely one.

In accordance with another mode of the invention, in the event that a network includes four network subscribers, for instance, one of which is used as the master, then the master in the example described would have the positional designation of zero, while the network subscribers following it would have the positional designations one, two and three.

The master knows the structure of the ring and the physical characteristics of each subscriber which, in connection with the positional designations, allows the definite association of the characteristics of the subscribers to the positional designations, and which allows selective, individual feed of data even to physically identical subscribers.

When the method of the invention is used it is equally possible for the network subscriber that is used as the master to generate a number other than zero at the beginning of network operation and to store it in memory, and for the successive network subscribers to each store a number in memory, as its individual positional designation, that is raised or lowered by an arbitrary number N, which may be either positive or negative.

In accordance with a further mode of the invention, in order to enable transmission of the positional designations in a uniform data format, the numbers representing the positional designation are transmitted between successive network subscribers in the form of data words having a length which is dimensioned in such a way that the largest number that can be transmitted is at least equivalent to the maximum possible number of network subscribers. The length of the corresponding data words may, for example, be one byte, which in the final analysis enables the positional designation of a maximum of 256 network subscribers by the method of the invention.

In accordance with an added mode of the invention, during the assignment of the positional data to the various network subscribers, the data can be transmitted between the network subscribers, for instance unidirectionally, each in a specified bit group format. The numbers that represent the positional designations can each be transmitted at specified bit positions of successive bit groups, so that in each case a designation is the product of the combination of certain bits of a plurality of successive bit groups.

In accordance with an additional mode of the invention, as already mentioned, the method can be used in the context of a preferred application in the individual, targeted communication with network subscribers that cooperate in a network which has a plurality of physically identical network subscribers. One such application can be if, in a stationary or mobile communications system in a home or vehicle, for example, a plurality of high-fidelity components cooperate and audio signals are sent to a plurality of physically identical speaker boxes.

Selective, individual communication with four speaker boxes, for instance, may be desirable in a vehicle, in which the boxes in the front and rear are to be driven with differing tone control, for instance because of differing acoustic behavior inside the vehicle. Another reason for driving the left and right boxes differently in the vehicle is that it is only in this way that what is generally a desirable stereo effect can be achieved.

In order to selectively drive four speaker boxes in a high-fidelity system in this way, each individual speaker box must be assigned an individual positional designation, so that it can also be supplied with an individual signal. This is easily achieved with the method of the invention.

In accordance with a concomitant mode of the invention, the method of the invention is advantageously also suitable for ascertaining the position of an incident line fault. This position finding is a problem in previously known networks, since while the line fault can be reported to the network subscriber being used as a master, nevertheless the master is unaware of where the line fault has occurred.

Since each network subscriber is numbered sequentially in a certain sense according to the method of the invention, whichever network subscriber is no longer receiving data from the preceding network subscriber because of the line fault that has occurred, can report its positional designation to the network subscriber being used as the master. In this way, the master learns that the line fault which has occurred can be located between the network subscriber which is reporting its positional designation and the network subscriber preceding it in the ring structure.

In this way, troubleshooting, which is complicated and tedious, especially when poorly accessible cabling inside a vehicle is involved, can be avoided in a simple way, and any necessary repair can be performed faster and more economically.

Other features which are considered as characteristic for the invention are set forth in the appended claims.

Although the invention is illustrated and described herein as embodied in a method for determining the position of a network subscriber in a network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
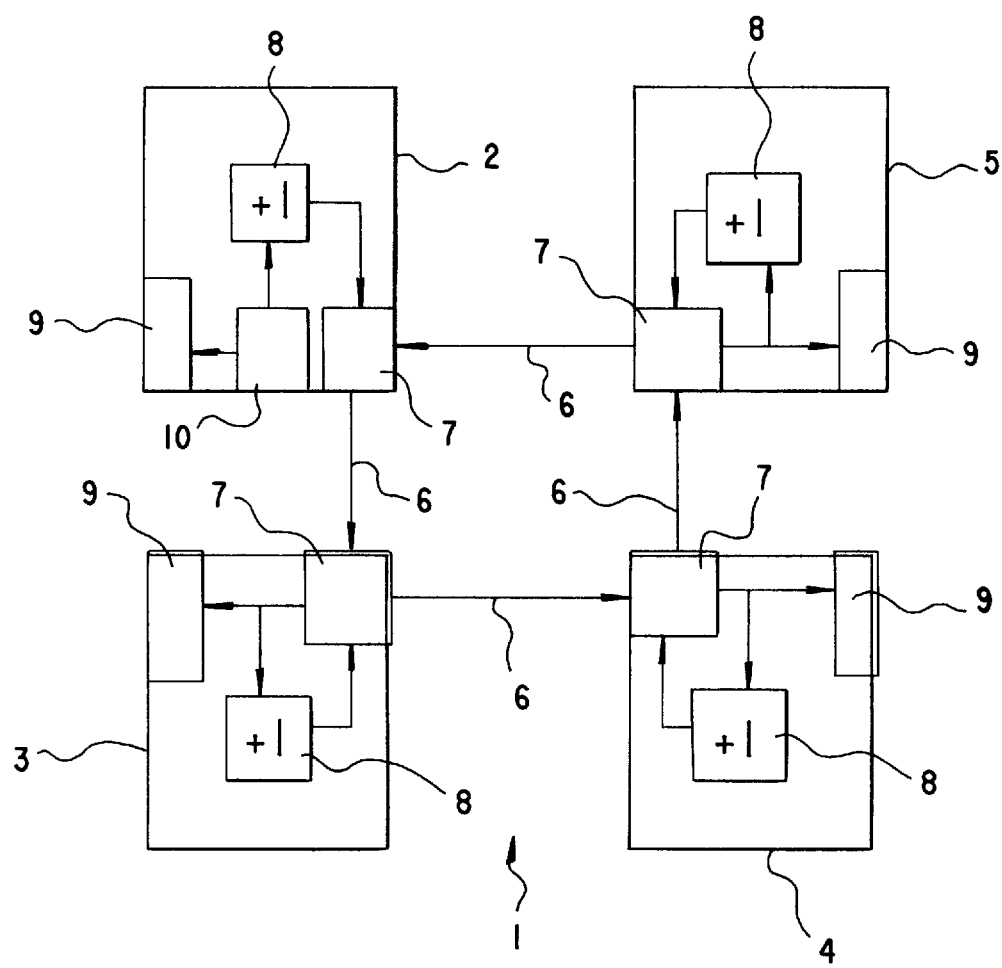
FIG. 1 is a block circuit diagram of a ring-like network that can be operated by a method according to the invention.

Referring now to the figures of the drawing in detail, and in particular to FIG. 1, there is seen a ring-like network 1 that has four network subscribers 2, 3, 4, 5, which are connected to one another by way of data lines 6 to form a ring-like structure.

Each of the network subscribers 2, 3, 4, 5 has an input/output interface 7, to which the respective network subscribers preceding them and following them in the unidirectional ring-like network are connected. The individual network subscribers 2, 3, 4, 5 communicate with one another through the interfaces 7 and the data lines 6.

Each network subscriber 2, 3, 4, 5 also has a component 8 that is suitable for incrementing a number applied to its input by one and for outputting this incremented number through its output.

Finally, each network subscriber is provided with a memory site 9, in which an individual network subscriber's positional designation can be stored in memory.

The network subscriber 2 which is used in the network 1 as a master is equipped with a component 10 that is suitable for generating a number, in particular zero.

Figure 2:
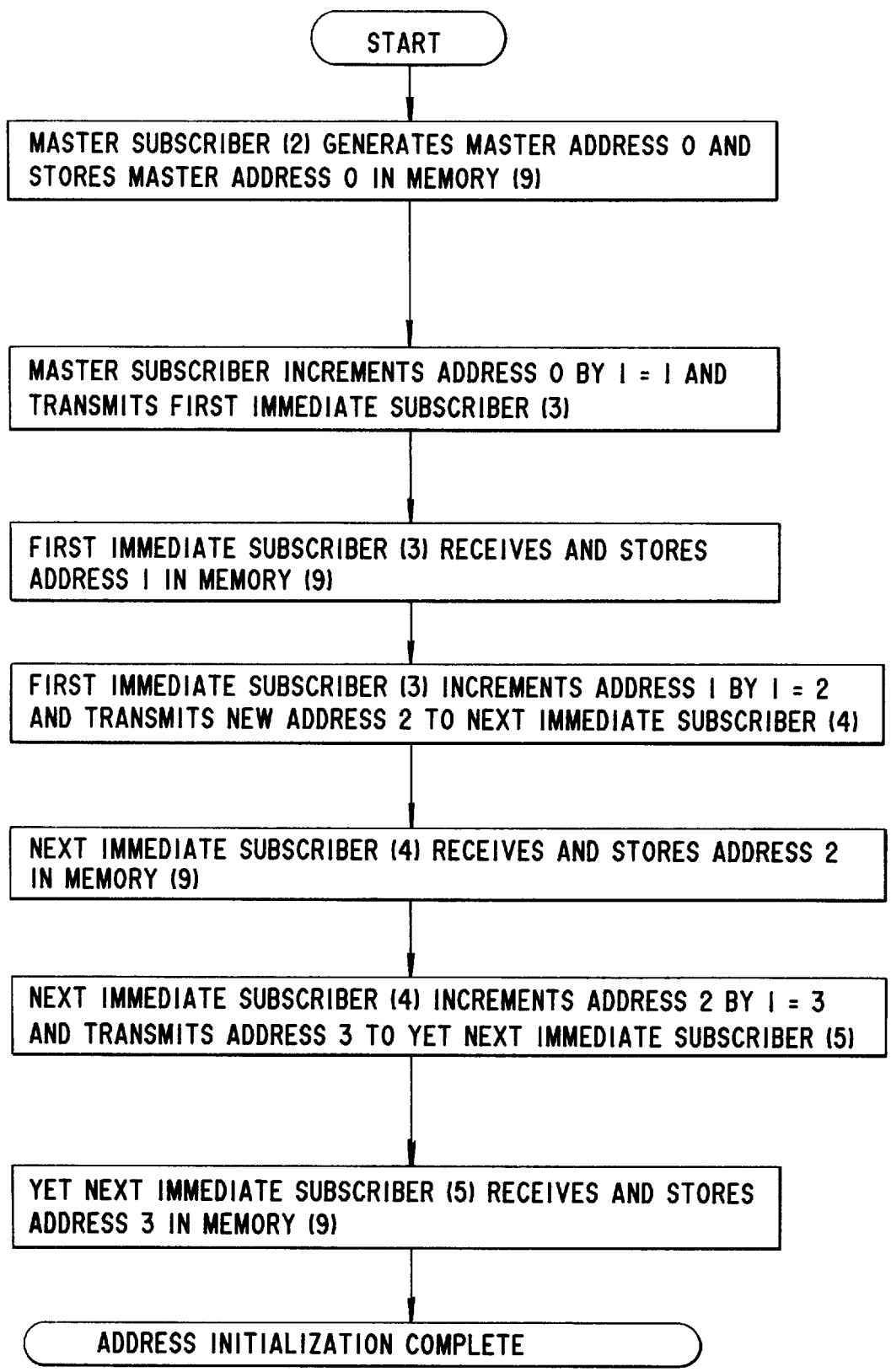
FIG. 2 is a flow diagram.

Upon being put into operation, the network described above functions as follows and as shown in FIG. 2.

The component 10 in the network subscriber 2 generates the number 0 and transfers it to the memory site 9, where this 0 is permanently stored in memory as the individual positional designation of the network subscriber 2.

At the same time, the component 10 also sends the 0 that has been generated to the component 8, which increments the zero by one and then supplies the incremented number, that is 1, through its output to the interface 7.

This incremented number 1 is sent from the interface 7 of the network subscriber 2 to the interface 7 of the next network subscriber 3, from which it is stored in the memory site 9 of the network subscriber 3 as the individual positional designation of that network subscriber. At the same time, the number 1 that is received from the interface 7 of the network subscriber 3 is incremented by one in the component 8 of the network subscriber 3 and sent in the form of the number 2 through the interfaces 7 of the network subscriber 3, 4 to the network subscriber 4. The received number 2 is sent from the interface 7 of the network subscriber 4 to the memory site 9 of the network subscriber 4, where it is stored as the permanent positional designation of that network subscriber. At the same time, this number 2 is incremented by one again in the component 8 of the network subscriber 4 and is sent in the form of the number 3 through the interface 7 of the network subscriber 4 and the data line 6 to the interface 7 of the network subscriber 5.

The number 3 is then sent from the interface 7 of the network subscriber 5 to the memory site 9 of the network subscriber 5, where it is stored in memory as the permanent positional designation of that subscriber.

This concludes the initialization process, in which each network subscriber 2, 3, 4, 5 is assigned an individual positional designation.

Once this initializing phase is concluded, the network subscriber 2 then has the positional designation 0, the network subscriber 3 the designation 1, the network subscriber 4 the designation 2, and the network subscriber 5 the designation 3. Through the use of these positional designations, each individual network subscriber can be communicated with individually, even if there are physically identical network subscribers in the network 1.

As noted above, the master knows the physical characteristics of the subscribers and the structure of the ring. This information, together with the positional information (designation) of each subscriber, makes it possible for the master to allow each subscriber to receive respectively associated information. The subscriber 2 thus responds to different data than the subscriber 3, even if the two have identical physical properties.

The network subscribers 2, 3, 4, 5 could also all be constructed in such a way as to be capable of acting as a master, or in other words, in terms of the invention, each of these network subscribers 2, 3, 4, 5 could have a component for generating a number. In that case, each of these network subscribers 2, 3, 4, 5 could be used as a master. This is appropriate in practice, because whichever network subscriber is turned on first can then always act as a master.

As already noted, the method according to the invention can also be used in order to ascertain the position at which a line fault has occurred in a unidirectional ring-like network.

For example, if a line fault occurs between the network subscribers 3 and 4, then the network subscriber 4 no longer receives data from the network subscriber 3. In that case, the network subscriber 4 reports its positional designation to the master 2 through the network subscriber 5.

If the master 2 receives the reported positional designation of the network subscriber 4 (which in the present example is "2"), this informs the master that a line fault has occurred between the network subscribers 3 and 4. In this way, a line fault can be located in the simplest possible way with minimal effort.

We claim:

1. In a method for determining the position of a network subscriber in a network having a ring structure with a plurality of network subscribers being connected to one another and including one network subscriber being used as a master, the improvement which comprises:

generating a number representing a physical positional designation of a subscriber in the master at an onset of network operation and storing the number internally in memory in the master; and assigning an individual physical positional designation to each network subscriber by having each network subscriber, beginning with the master, cause the network subscriber immediately following it in the ring structure to store a number in memory each representing one subscriber's physical positional designation and being raised by a number over the subscriber's physical positional designation of the network subscriber preceding it, such that the master is enabled, based on information concerning the ring structure of the network, to supply each of the subscribers with selected data whose content is dependent on the individual position of each subscriber.

2. The method according to claim 1, which comprises setting the number generated by the master at the beginning of the network operation as being equal to zero, and setting the number by which the subscriber's positional designation is raised as being equal to one.

3. The method according to claim 1, which comprises transmitting the numbers representing the positional designations between successive network subscribers in the form of data words having a length permitting the largest number that can be transmitted to be at least equivalent to a maximum number of possible network subscribers.

4. The method according to claim 3, which comprises transmitting the data unidirectionally between the network subscribers, each in a specified bit group format, and transmitting each of the numbers representing the positional designations at specified bit positions of successive bit groups during the assignment of the subscriber's positional designations.

5. The method according to claim 1, which comprises ascertaining the position of a line fault that has occurred by causing a network subscriber no longer receiving data from the preceding network subscriber as a result of the line fault to report its positional designation to the master.

6. In a method for individual and targeted communication with individual network subscribers in a network having a ring structure with a plurality of physically identical network subscribers being connected to one another and including one network subscriber being used as a master, the improvement which comprises:

generating a number representing a subscriber's physical positional designation in the master at an onset of network operation and storing the number internally in memory in the master; and assigning an individual physical positional designation to each network subscriber by having each network subscriber, beginning with the master, cause the network subscriber immediately following it in the ring structure to store a number in memory each representing one subscriber's physical positional designation and being raised by a number over the subscriber's physical positional designation of the network subscriber preceding it, such that the master is enabled, based on information concerning the ring structure of the network, to supply each of the subscribers with selected data whose content is dependent on the individual position of each subscriber.

7. In a method for individual and targeted communication with speaker boxes in a network having a ring structure with a plurality of physically identical speaker boxes and other high-fidelity components being connected to one another and including one speaker box being used as a master, the improvement which comprises:

generating a number representing a physical positional designation in the master at an onset of network operation and storing the number internally in memory in the master; and assigning an individual physical positional designation to each speaker box by having each speaker box, beginning with the master, cause the speaker box immediately following it in the ring structure to store a number in memory each representing one physical positional designation and being raised by a number over the physical positional designation of the speaker box preceding it, such that the master is enabled, based on information concerning the ring structure of the network, to supply each of the subscribers with selected data whose content is dependent on the individual position of each subscriber.

8. In a method for determining the position of a network subscriber in a stationary communications network, in particular in the home, having a ring structure with a plurality of network subscribers being connected to one another and including one network subscriber being used as a master, the improvement which comprises:

generating a number representing a subscriber's physical positional designation in the master at an onset of network operation and storing the number internally in memory in the master; and assigning an individual physical positional designation to each network subscriber by having each network subscriber, beginning with the master, cause the network subscriber immediately following it in the ring structure to store a number in memory each representing one subscriber's physical positional designation and being raised by a number over the subscriber's physical positional designation of the network subscriber preceding it, such that the master is enabled, based on information concerning the ring structure of the network, to supply each of the subscribers with selected data whose content is dependent on the individual position of each subscriber.

9. In a method for determining the position of a network subscriber in a mobile communications network, in particular in a motor vehicle, having a ring structure with a plurality of network subscribers being connected to one another and including one network subscriber being used as a master, the improvement which comprises:

generating a number representing a subscriber's physical positional designation in the master at an onset of network operation and storing the number internally in memory in the master; and assigning an individual physical positional designation to each network subscriber by having each network subscriber, beginning with the master, cause the network subscriber immediately following it in the ring structure to store a number in memory each representing one subscriber's physical positional designation and being raised by a number over the subscriber's physical positional designation of the network subscriber preceding it, such that the master is enabled, based on information concerning the ring structure of the network, to supply each of the subscribers with selected data whose content is dependent on the individual position of each subscriber.

* * * * *